United States Patent
Class et al.

(10) Patent No.: US 6,230,132 B1
(45) Date of Patent: May 8, 2001

(54) PROCESS AND APPARATUS FOR REAL-TIME VERBAL INPUT OF A TARGET ADDRESS OF A TARGET ADDRESS SYSTEM

(75) Inventors: Fritz Class, Roemerstein; Thomas Kuhn, Ulm; Carsten-Uwe Moeller, Koengen; Frank Reh, Stuttgart; Gerhard Nuessle, Blaustein, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/038,147

(22) Filed: Mar. 10, 1998

(30) Foreign Application Priority Data

Mar. 10, 1997 (DE) .............................................. 197 09 518

(51) Int. Cl.⁷ .................................................. G10L 11/00
(52) U.S. Cl. ............................................ 704/270; 704/276
(58) Field of Search .................................... 704/270, 276; 701/210

(56) References Cited

U.S. PATENT DOCUMENTS

| | | | |
|---|---|---|---|
| 4,866,778 | 9/1989 | Baker | 381/43 |
| 5,054,082 | * 10/1991 | Smith et al. | 704/275 |
| 5,165,095 | * 11/1992 | Borcherding . | |
| 5,172,321 | * 12/1992 | Ghaem et al. | 364/444 |
| 5,677,990 | * 10/1997 | Junqua | 704/255 |
| 5,832,429 | * 11/1998 | Gammel et al. | 704/255 |
| 5,893,901 | * 4/1999 | Maki | 704/260 |

FOREIGN PATENT DOCUMENTS

| | | |
|---|---|---|
| 36 08 497 A1 | * 9/1987 | (DE) . |
| 196 00 700 A1 | * 8/1996 | (DE) . |
| 195 33 541 | 3/1997 | (DE) . |
| 0 346 483 | 12/1989 | (EP) . |
| 0 477 688 A2 | * 9/1991 | (EP) . |
| 0 736 853 A1 | * 4/1996 | (EP) . |
| 61-147298 | * 7/1986 | (JP) . |
| 6-66591 | * 3/1994 | (JP) . |
| 6-85893 | * 3/1994 | (JP) . |
| 6-42154 | * 6/1994 | (JP) . |
| 6-54440 | * 7/1994 | (JP) . |
| 7-219961 | * 8/1994 | (JP) . |
| 6-261126 | * 9/1994 | (JP) . |
| 6-318977 | * 11/1994 | (JP) . |
| 7-64480 | * 3/1995 | (JP) . |
| 7-219590 | * 8/1995 | (JP) . |
| 7-261784 | * 10/1995 | (JP) . |
| 7-319383 | * 12/1995 | (JP) . |
| 8-166797 | * 6/1996 | (JP) . |
| 8-202386 | * 8/1996 | (JP) . |
| 8-328584 | * 12/1996 | (JP) . |
| WO 96/13030 | * 5/1996 | (WO) . |

* cited by examiner

Primary Examiner—Krista Zele
Assistant Examiner—Michael N. Opsasnick
(74) Attorney, Agent, or Firm—Evenson, McKeown, Edwards & Lenahan, P.L.L.C.

(57) ABSTRACT

In a method for real time speech input of a destination address into a navigation system, the speech statements that are entered by a user are recognized by a speech recognition device and classified in accordance with their recognition probability. The speech statement with the greatest recognition probability is identified as the input speech statement, with at least one speech statement being an admissible speech command that activates the operating functions of the navigation system associated with this speech command. (All the admissible speech statements being stored in at least one database.) According to the invention, at least one operating function of the navigation system comprises an input dialogue. Following activation of that operating function, depending on the input dialogue, at least one lexicon is generated in real time from the admissible speech statements stored in at least one database, and the generated lexicon is loaded as vocabulary into the speech recognition device.

17 Claims, 10 Drawing Sheets

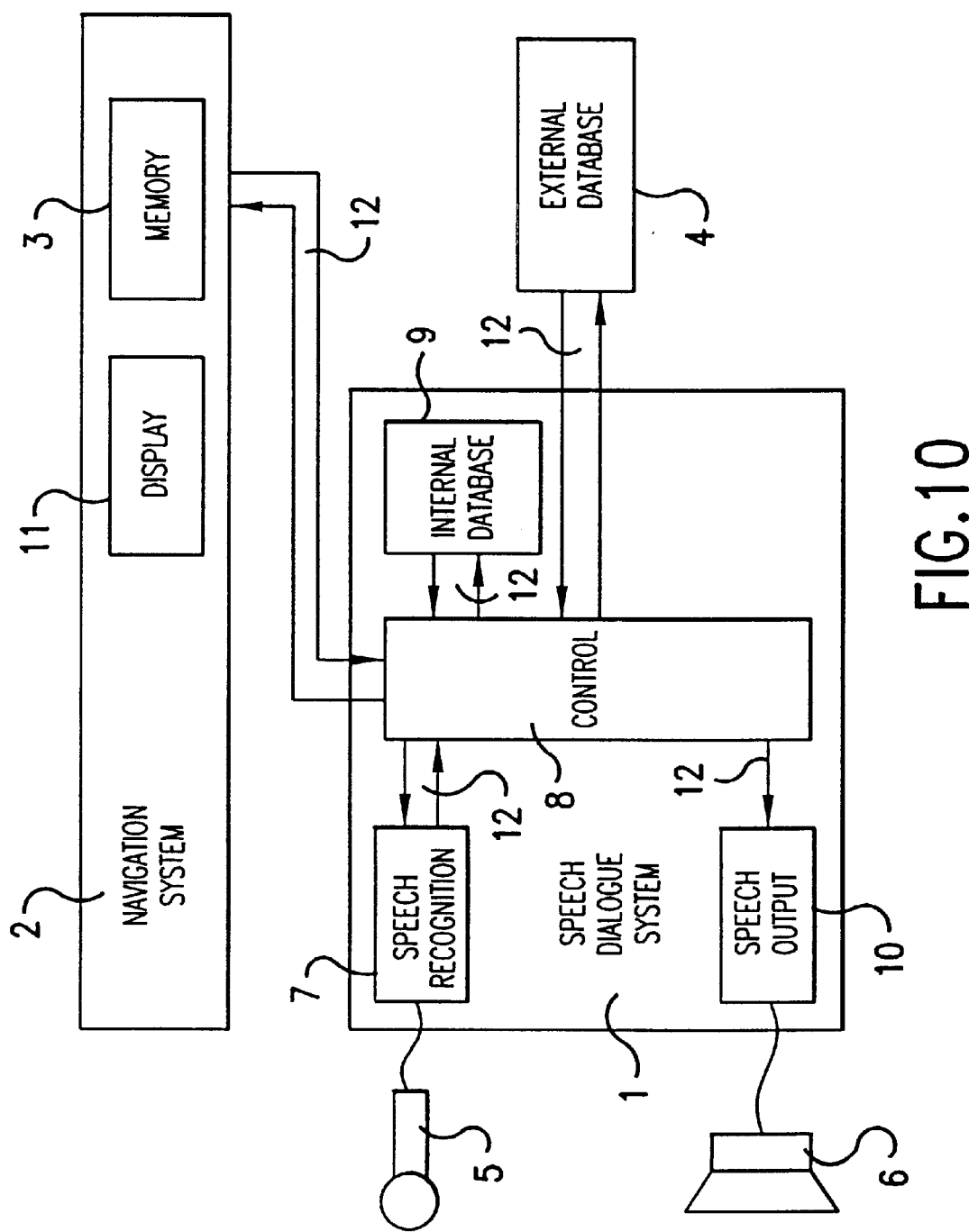

PROCESS AND APPARATUS FOR REAL-TIME VERBAL INPUT OF A TARGET ADDRESS OF A TARGET ADDRESS SYSTEM

BACKGROUND AND SUMMARY OF THE INVENTION

This application claims the priority of German patent document 197 09 518.6, filed Mar. 10, 1997, the disclosure of which is expressly incorporated by reference herein.

The invention relates to a method and apparatus for real-time speech input of a destination address into a navigation system.

German patent document DE 196 00 700 describes a target guidance system for a motor vehicle in which a fixedly mounted circuit, a contact field circuit or a voice recognition apparatus can be used as an input device. The document, however, does not deal with the vocal input of a target address in a target guidance system.

Published European patent application EP 0 736 853 A1 likewise describes a target guidance system for a motor vehicle. The speech input of a target address in a target guidance system is, however, not the subject of this document.

Published German patent application DE 36 08 497 A1 describes a process for speech controlled operation of a long distance communication apparatus, especially an auto telephone. It is considered a disadvantage of the process that it does not deal with the special problems in speech input of a target address in a target guidance system.

Not yet prepublished German patent application P 195 33 541.4-52 discloses a method and apparatus of this type for automatic control of one or more devices, by speech commands or by speech dialogue in real time. Input speech commands are recognized by a speech recognition device comprising a speaker-independent speech recognition engine and a speaker-independent additional speech recognition engine that identifies recognition probability as the input speech command, and initiates the functions of the device or devices associated with this speech command. The speech command or speech dialogue is formed on the basis of at least one syntax structure, at least one basic command vocabulary, and if necessary at least one speaker-specific additional command vocabulary. The syntax structures and basic command vocabularies are presented in speaker-independent form and are established in real time. The speaker-specific additional vocabulary is input by the respective speaker and/or modified by him/her, with an additional speech recognition engine that operates according to a speaker-dependent recognition method being trained in training phases, during and outside real-time operation by each speaker, to the speaker-specific features of the respective. speaker by at least one-time input of the additional command. The speech dialogue and/or control of the devices is developed in real time as follows:

Speech commands input by the user are fed to a speaker-independent speech recognition engine operating on the basis of phonemes, and to the speaker-dependent additional speech recognition engine where they are subjected to feature extraction and are checked for the presence of additional commands from the additional command vocabulary and classified in the speaker-dependent additional speech recognition engine on the basis of the features extracted therein.

Then the classified commands and syntax structures of the two speech recognition engines, recognized with a certain probability, are assembled into hypothetical speech commands and the latter are checked and classified for their reliability and recognition probability in accordance with the syntax structure provided.

Thereafter, the additional hypothetical speech commands are checked for their plausibility in accordance with specified criteria and, of the hypothetical speech commands recognized as plausible, the one with the highest recognition probability is selected and identified as the speech command input by the user.

Finally, the functions of the device to be controlled that are associated with the identified speech command are initiated and/or answers are generated in accordance with a predetermined speech dialogue structure to continue the speech dialogue. According to this document, the method described can also be used to operate a navigation system, with a destination address being input by entering letters or groups of letters in a spelling mode and with it being possible for the user to supply a list for storage of destination addresses for the navigation system using names and abbreviations that can be determined in advance.

The disadvantage of this method is that the special properties of the navigation system are not discussed, and only the speech input of a destination location by means of a spelling mode is described.

The object of the invention is to provide an improved method and apparatus of the type described above, in which the special properties. of a navigation system are taken into account and simplified.

Another object of the invention is to provide such an arrangement which enables faster speech input of a destination address in a navigation system, improving operator comfort.

These and other objects and advantages are achieved by the method and apparatus according to the invention for speech input of destination addresses in a navigation system, which uses a known speech recognition device, such as described for example in the document referred to above, comprising at least, one speaker-independent speech-recognition engine and at least one speaker-dependent additional speech-recognition engine. The method according to the invention makes possible various input dialogues for speech input of destination addresses. In a first input dialogue (hereinafter referred to as the "destination location input"), the speaker-independent speech recognition device is used to detect destination locations spoken in isolation, and if such destination location is not recognized, to recognize continuously spoken letters and/or groups of letters. In a second input dialogue (hereinafter referred to as "spell destination location"), the speaker-independent speech recognition engine is used to recognize continuously spoken letters and/or groups of letters. In a third input dialogue (hereinafter referred to as "coarse destination input"), the speaker-independent speech-recognition engine is used to recognize destination locations spoken in isolation, and if such destination location is recognized, to recognize continuously spoken letters and/or groups of letters. In a fourth input dialogue (hereinafter referred to as "indirect input"), the speaker-independent speech recognition engine is used to recognize continuously spoken numbers and/or groups of numbers. In a fifth input dialogue (hereinafter referred to as "street input"), the speaker-independent speech-recognition device is. used to recognize street names spoken in isolation and if the street name spoken in isolation is not recognized, to recognize continuously spoken letters and/or groups of letters.

By means of the input dialogues described above, the navigation system is supplied with verified destination addresses, each comprising a destination location and a street. In a sixth input dialogue (hereinafter referred to as "call up address"), in addition to the speaker-independent speech-recognition engine, the speaker-dependent additional speech-recognition engine is used to recognize keywords spoken in isolation. In a seventh input dialogue (hereinafter referred to as "store address"), a keyword spoken in isolation by the user is assigned a destination address entered by the user, so that during the input dialogue "call up address" a destination address associated with the corresponding recognized keyword is transferred to the navigation system.

The method according to the invention is based primarily on the fact that the entire admissible vocabulary for a speech-recognition device is not loaded into the speech-recognition device at the moment it is activated; rather, at least a required lexicon is generated from the entire possible vocabulary during real-time operation and is loaded into the speech-recognition device as a function of the required input dialogue for executing an operating function. There are more than 100,000 locations In the Federal Republic of Germany that can serve as vocabulary for the navigation system. If this vocabulary were to be loaded into the speech-recognition device, the recognition process would be extremely slow and prone to error. A lexicon generated from this vocabulary comprises only about 1500 words, so that the recognition process would be much faster and the recognition rate higher.

At least one destination file that contains all possible destination addresses and certain additional information for the possible destination addresses of a guidance system, and is stored in at least one database, is used as the database for the method according to the invention. From this destination file, lexica are generated that comprise at least parts of the destination file, with at least one lexicon being generated in real time as a function of at least one activated input dialogue. It is especially advantageous for the destination file for each stored destination location to contain additional information, for example political affiliation or a additional naming component, postal code or postal code range, telephone area code, state, population, geographic code, phonetic description, or membership in the lexicon. This additional information can then be used to resolve ambiguities or to accelerate the search for the desired destination location.

Instead of the phonetic description, a transcription of the phonetic description in the form of a chain of indices, depending on the implementation of the transcription, can be used instead of the phonetic description for the speech-recognition device. In addition, a so-called automatic phonetic transcription that performs a rule-based conversion of orthographically present names using a table of exceptions into a phonetic description can be provided. Entry of lexicon membership is only possible if the corresponding lexica are generated in an "off-line editing mode," separately from the actual operation of the navigation system, from the destination file and have been stored in the (at least one) database, for example a CD-ROM or a remote database at a central location that can be accessed by corresponding communications devices such as a mobile radio network. Generation of the lexica in the "off-line editing mode" makes sense only if sufficient storage space is available in the (at least one) database and is especially suitable for lexica that are required very frequently. In particular, a CD-ROM or an external database can be used as the database for the destination file since in this way the destination file can always be kept up to date.

At the moment, not all possible place names in the Federal Republic of Germany have been digitized and stored in a database. Similarly, a corresponding street list is not available for all locations. Therefore it is important to be able to update the database at any time. An internal nonvolatile storage area of the navigation system can also be used as the database for the (at least one) lexicon generated in the "off-line editing mode."

To facilitate more rapid speech entry of a desired destination address into the navigation system, following the initialization phase of the navigation system or with sufficiently large nonvolatile internal storage, a basic vocabulary is loaded each time the database is changed, which vocabulary comprises at least one basic lexicon generated from the destination file. This basic lexicon can be generated in the "off-line editing mode." The basic lexicon can be stored in the database in addition to the destination file or can be stored in a nonvolatile internal memory area of the navigation system. As an alternative, generation of the basic lexicon can wait until after the initialization phase. Dynamic generation of lexica during real-time operation of the navigation system, in other words during operation, offers two important advantages. Firstly this creates the possibility of putting together any desired lexica from the database stored in the (at least one) database, and secondly considerable storage space is saved in the (at least one) database since not all of the lexica required for the various input dialogues need to be stored in the (at least one) database prior to activation of the speech-recognition engine.

In the embodiment described below, the basic vocabulary comprises two lexica generated in the "off-line editing mode" and stored in the (at least one) database, and two lexica generated following the initialization phase. If the speech-recognition device has sufficient working memory, the basic vocabulary is loaded into it after the initialization phase, in addition to the admissible speech commands for the speech dialogue system, as described in the above mentioned German patent application P 195 33 541.4-52. Following the initialization phase and pressing of the PTT (push-to-talk) button, the speech dialogue system then allows the input of various information to control the devices connected to the speech dialogue system as well as to perform the basic functions of a navigation system and to enter a destination location and/or a street as the destination address for the navigation system. If the speech-recognition device has. insufficient RAM, the basic vocabulary is not loaded into it until a suitable operating function that accesses the basic vocabulary has been activated.

The basic lexicon, stored in at least one database, comprises the "p" largest cities in the Federal Republic of Germany, with the parameter "p" in the design described being set at 1000. This directly accesses approximately 53 million citizens of the FRG or 65% of the population. The basic lexicon comprises all locations with more than 15,000 inhabitants. A regional lexicon also stored in the database includes "z" names of regions and areas such as Bodensee, Schwabische Alb, etc., with the regional lexicon in the version described comprising about 100 names for example. The regional lexicon is used to find known areas and conventional regional names. These names cover combinations of place names that can be generated and loaded as a new regional lexicon after the local or regional name is spoken. An area lexicon, generated only after initialization, comprises "a" dynamically loaded place names in the vicinity of the actual vehicle location, so that even smaller places in the immediate vicinity can be addressed directly, with the parameter "a" in the embodiment described being set at 400.

This area lexicon is constantly updated at certain intervals while driving so that it is always possible to address locations in the immediate vicinity directly. The current vehicle location is reported to the navigation system by a positioning system known from the prior art, for example by means of a global positioning system (GPS). The previously described lexica are assigned to the speaker-independent speech-recognition engine. A name lexicon that is not generated from the destination file and is assigned to the speaker-dependent speech-recognition engine comprises approximately 150 keywords from the personal address list of the user, spoken by the user. Each keyword is then given a certain destination address from the destination file by the input dialogue "store address." These specific destination addresses are transferred to the navigation system by speech input of the associated keywords using the input dialogue "call up address." This results in a basic vocabulary of about 1650 words that are recognized by the speech-recognition device and can be entered as words spoken in isolation (place names, street names, keyword).

Provision can also be made for transferring addresses from an external data source, for example a PDA (personal digital assistant) or a portable laptop computer, by means of data transfer to the speech dialogue system or to the navigation system and integrate it as an address lexicon in the basic vocabulary. Normally, no phonetic descriptions for the address data (name, destination location, street) are stored in the external data sources. Nevertheless in order to be able to transfer these data into the vocabulary for a speech-recognition device, an automatic phonetic transcription of these address data, especially the names, must be performed. Assignment to the correct destination location is then performed using a table.

For the sample dialogues described below, a destination file must be stored in the (at least one) database of the navigation system that contains a data set according to Table 1 in the place found in the navigation system. Depending on the storage location and availability, parts of the information entered can also be missing. However, this only relates to data used to resolve ambiguities, for example additional naming component, county, telephone area codes, etc. If address data from an outside data source are used, the address data must be supplemented accordingly. The word subunits for the speech-recognition device are especially important, which act as hidden Markov model speech recognition engines (HMM recognition engines).

TABLE 1

| Description of Entry | Example |
| --- | --- |
| Place Name | Flensburg |
| Political Affiliation or additional naming component | — |
| Postal Code or Postal Code Range | 24900–24999 |
| Telephone Area Code | 0461 |
| County | Flensburg, county |
| State | Schleswig-Holstein |
| Population | 87,526 |
| Geographic Code | 9.43677, 54.78204 |
| Phonetic Description | \|fl'Ens\|bUrk\| |
| Word Subunits for HMM Speech-Recognizing Device | f[LN]le e[LN] n[C] s b[Vb] U[Vb]r k. or 101 79 124 117 12 39 35 82 68 |
| Lexicon Membership | 3, 4, 78 . . . |

Other objects, advantages and novel features of the present invention will become apparent from the following detailed description of the invention when considered in conjunction with the accompanying drawings.

BRIEF DESCRIPTION OF THE DRAWINGS

FIG. 10 is a schematic view of a block diagram of a device for performing the method according to the invention.

DETAILED DESCRIPTION OF THE DRAWINGS

Figure 1:
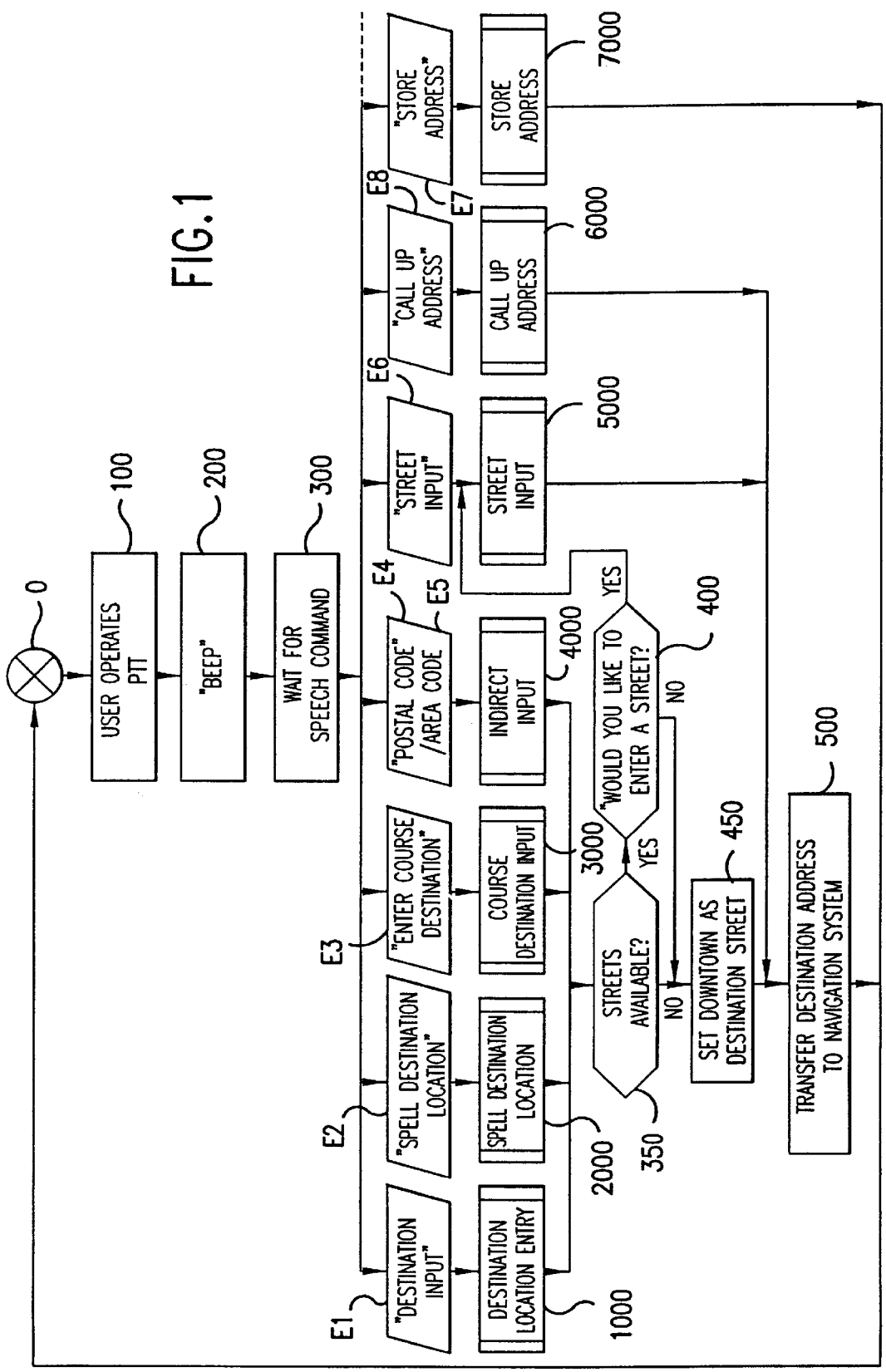
FIG. 1 is a schematic diagram providing an overview of the possible input dialogues for speech input of a destination address for a navigation system according to the invention.

FIG. 1 shows an overview of the possible input dialogues for speech input of a destination address for a navigation system. A speech dialogue between a user and a speech dialogue system according to FIG. 1 begins following the initialization phase with a wait state 0, in which the speech dialogue system stops until the PTT button (push-to-talk button) is actuated, and to which the speech dialogue system returns after the speech dialogue is terminated. The user activates the speech dialogue system by actuating the PTT button in step 100. The speech dialogue system replies in step 200 with an acoustic output, for example by a signal tone or by a speech output indicating to the user that the speech dialogue system is ready to receive a speech command. In step 300, the speech dialogue system waits for an admissible speech command in order, by means of dialogue and process control, to control the various devices connected to the speech dialogue system or to launch a corresponding input dialogue. However, no details of the admissible speech commands will be provided at this point that relate to the navigation system. The following speech commands relating to the various input dialogues of the navigation system can now be entered:

"Destination location input" E1: This speech command activates the input dialogue "destination location input."

"Spell destination location" E2: This speech command activates the input dialogue "spell destination location."

"Coarse destination input" E3: This speech command activates the input dialogue "coarse destination input."

"Postal code" E4 or "telephone area code" E5: The input dialogue "indirect input" is activated by these two speech commands.

"Street input" E6: This speech command activates the input dialogue "street input."

"Store address" E7: This speech command activates the input dialogue "store address."

"Call up address" E8: This speech command activates the input dialogue "call up address."

Instead of the above, of course, other terms can be used to activate the various input dialogues. In addition to the above speech commands, general speech commands can also be used to control the navigation system, for example "navigation information," "start/stop navigation," etc.

After starting an input dialogue by speaking the corresponding speech command, the corresponding lexica are loaded as the vocabulary into the speech recognition device. With a successfully performed speech input of the destination location as part of the destination address input by means of one of the input dialogues "destination location input" in step 1000, "spell destination location" in step 2000, "coarse destination input" in step 3000, or "indirect input" in step 4000, a check is then made in step 350 whether or not a corresponding street list is available for the recognized destination location. If the check yields a negative result, a branch is made to step 450. If the check yields a positive result, a check is made in step 400 to determine whether or not the user wants to enter a street name. If the user responds to question 400 by "yes," the input dialogue "street input" is called up. If the user answers question 400 by "no" a branch is made to step 450. Question 400 is therefore implemented only if the street names for the corresponding destination location are included in the navigation system. In step 450, the recognized desired destination location is automatically updated by entering "center" or with "downtown" as the street input, since only a complete destination address can be transferred to the navigation system, with the destination address in addition to the destination location also comprising a street or a special destination, for example the railroad station, airport, downtown, etc. In step 500, the destination address is passed to the navigation system. Then the speech dialogue is concluded and the speech dialogue system returns to wait state 0.

If the speech command "street input" E6 was spoken by the user at the beginning of the speech dialogue in step 300 and recognized by the speech recognition device, in step 5000 the input dialogue "street input" will be activated. Then, following the successful input of the desired destination location and the street, the destination address is transferred to the navigation system in step 500. If the speech command "call up address" E8 was spoken by the user at the beginning of the speech dialogue in step 300 and was recognized by the speech recognition device, in step 6000 the input dialogue "call up address" will be activated. In the input dialogue "call up address" a keyword is spoken by the user and the address associated with the spoken keyword will be transferred in step 500 as a destination address to the navigation system. If the speech command "store address" E7 was spoken by the user at the beginning of the. speech dialogue in step 300 and recognized by the speech recognition device, in step 7000 the input dialogue "store address" is activated. By means of input dialogue "store address," a destination address that has been entered is stored under a keyword spoken by the user in the personal address list. Then the input dialogue "call up address" is ended and the system returns to wait state 0.

Figure 2:
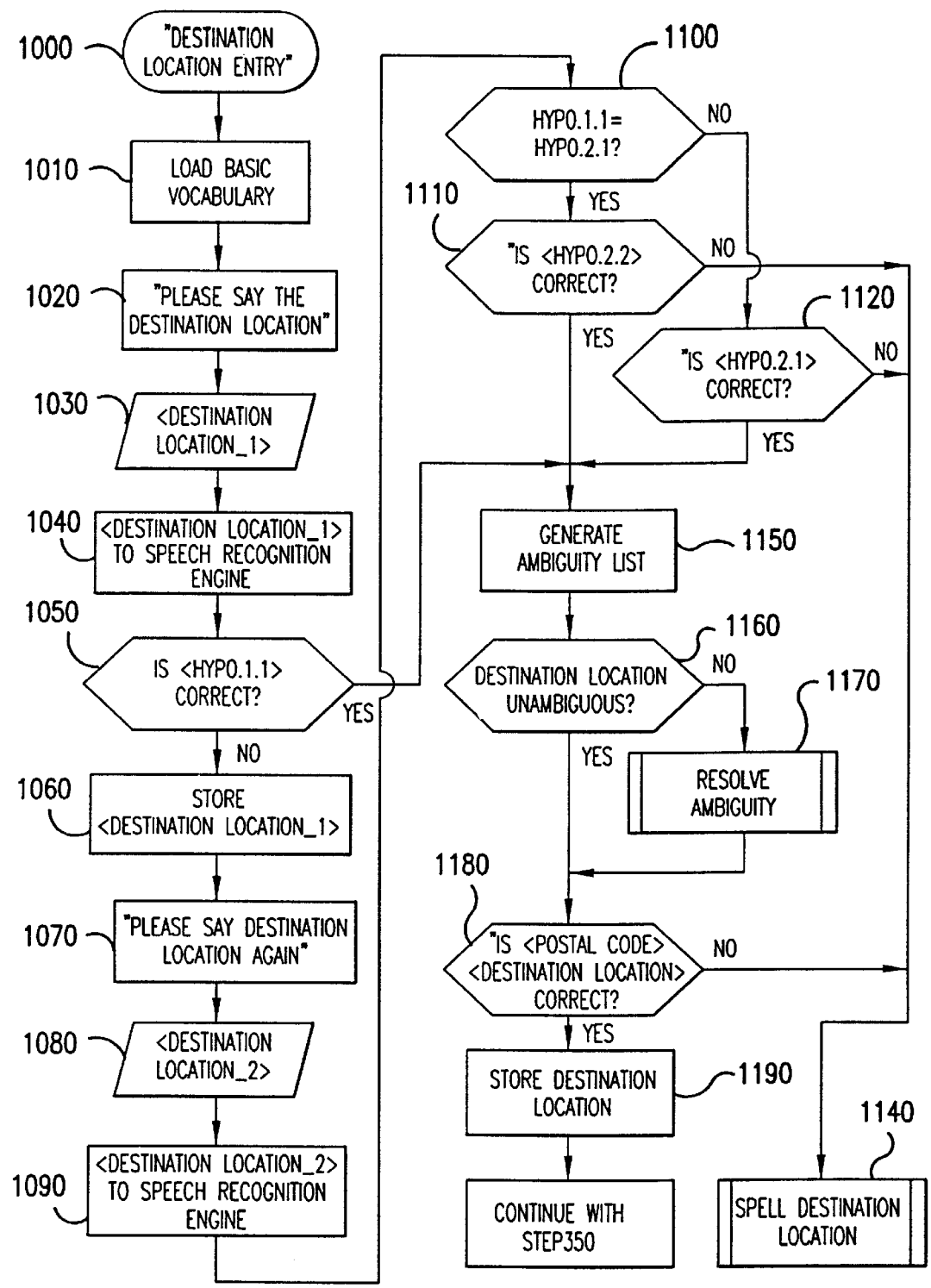
FIG. 2 is a schematic representation of a flowchart of a first embodiment of the input dialogue "destination location input"

FIG. 2 shows in a schematic form a first embodiment of the input dialogue "enter destination location." Following activation of the input dialogue "enter destination location" in step 1000, by virtue of the speech command "enter destination location" E1 spoken in step 300 by the user and recognized by the speech recognition device, in step 1010 the basic vocabulary is loaded into the speech recognition device as can be seen from FIG. 2. The loading of the basic vocabulary into the speech recognition device basically can also be performed at another point, for example after the initialization phase or following the actuation of the PTT button. This depends on the speed of the loading process and on the type of speech recognition device used. Then in step 1020 the user is requested to enter a destination location. In step 1030 the user enters the desired destination location by speech input. This speech input is transferred in step 1040 as an acoustic value <destination location_1> to the speech recognition device and compared there with the basic vocabulary that was loaded; sampling values in the time or frequency domain or feature vectors can be transmitted to the speech recognition device as an acoustic value. The nature of the acoustic value thus transferred likewise depends on the type of speech recognition engine employed.

As a result, the speech recognition engine supplies a first hypothesis list hypo.1 with place names which are sorted by probability of recognition. If the hypothesis list or hypo.1 contains homophonic place names, i.e. place names that are pronounced identically but are written differently, for example Ahlen and Aalen, both place names receive the same recognition probability and both place names are taken into account in the continuation of the input dialogue. Then in step 1050 the place name with the greatest recognition probability is output as speech output <hypo.1.1> to the user with the question as to whether or not <hypo.1.1.> corresponds to the desired input destination location <destination location_1>. (At this point it still makes no difference whether several entries are present at the first location on the hypothesis list since the place names are pronounced identically.) If the answer to question 1050 is "yes" a jump is made to step 1150. If the user answers the question with "no" the acoustic value <destination location_1> of the destination location entered in step 1060 is stored for a possible later recognition process using another lexicon. Then the user is requested in step 1070 to pronounce the destination location again. In step 1080 the user enters the destination location once again by speech input. This speech input is transferred in step 1090 as the acoustic value <destination location_2> to the speech recognition device and compared there with the basic vocabulary that has been loaded. As a result the speech recognition device offers a second hypothesis list hypo.2 with place names sorted by recognition probability.

A check is made in step 1100 as to whether the ASCII value of the place name or, in the case of homophonic place names, the ASCII values of the place names, corresponds or correspond with the greatest recognition probability hypo.1.1 of the hypothesis list hypo.1 with the ASCII value of the place name or, in the case of homophonic place names, the ASCII values of the place names, with the maximum recognition probability hypo.2.1. If so, in step 1110 the place names with the second-greatest recognition probability from the second hypothesis list hypo.2 are output as speech output <hypo.2.2> with the question to the user as to whether or not <hypo.2.2> is the desired destination location.

If check 1100 leads to a negative result, in step 1120 the place name with the greatest recognition probability from the second hypothesis list hypo.2 is output as speech output <hypo.2.1> to the user with the question as to whether or not <hypo.2.1> is the desired destination location. If the answer of the user shows that the desired destination location has still not been recognized, in step 1140 the input dialogue "spell destination location" is called up. If the user's reply shows that a destination location has been recognized in step 1150 (step 1150 is also reached if question 1050 was answered "yes") the ASCII value of the recognized destination location, or in the case of homophonic place names, the ASCII values of the recognized place names (either hypo.1.1, hypo.2.1, or hypo.2.2) is compared with the ASCII values of the place names stored in the data sets of the destination file. From all of the place names in which one of the recognized destination locations is completely contained in the spelling, an ambiguity list is then generated. In the case of homophonic place names, the ambiguity list always contains several entries and the result is therefore not unambiguous.

At this point however even in the case of non-homophonic place names an ambiguity list with several entries, the so-called "Neustadt problem" can arise when the orthographic a representation of the destination location entered occurs several times in the destination file. For this reason in step 1160 a check is made to determine whether or not the destination location was clearly recognized. If the destination location is ambiguous, a branch is made to step 1170. At this point an eighth input dialogue is called up, hereinafter referred to "resolve ambiguity." If the destination location is unambiguous, by means of the speech output in step 1180 the destination location found with certain additional information, for example the postal code, place name, and state, is output with the question to the user as to whether or not it is the desired destination location. If the user answers the question by "no" a branch is made to step 1140 which calls up the input dialogue "spell destination location." If the user answers the question by "yes" in step 1190 the destination location is stored temporarily and a jump is made to step 350 (see description of FIG. 1).

Figure 3:
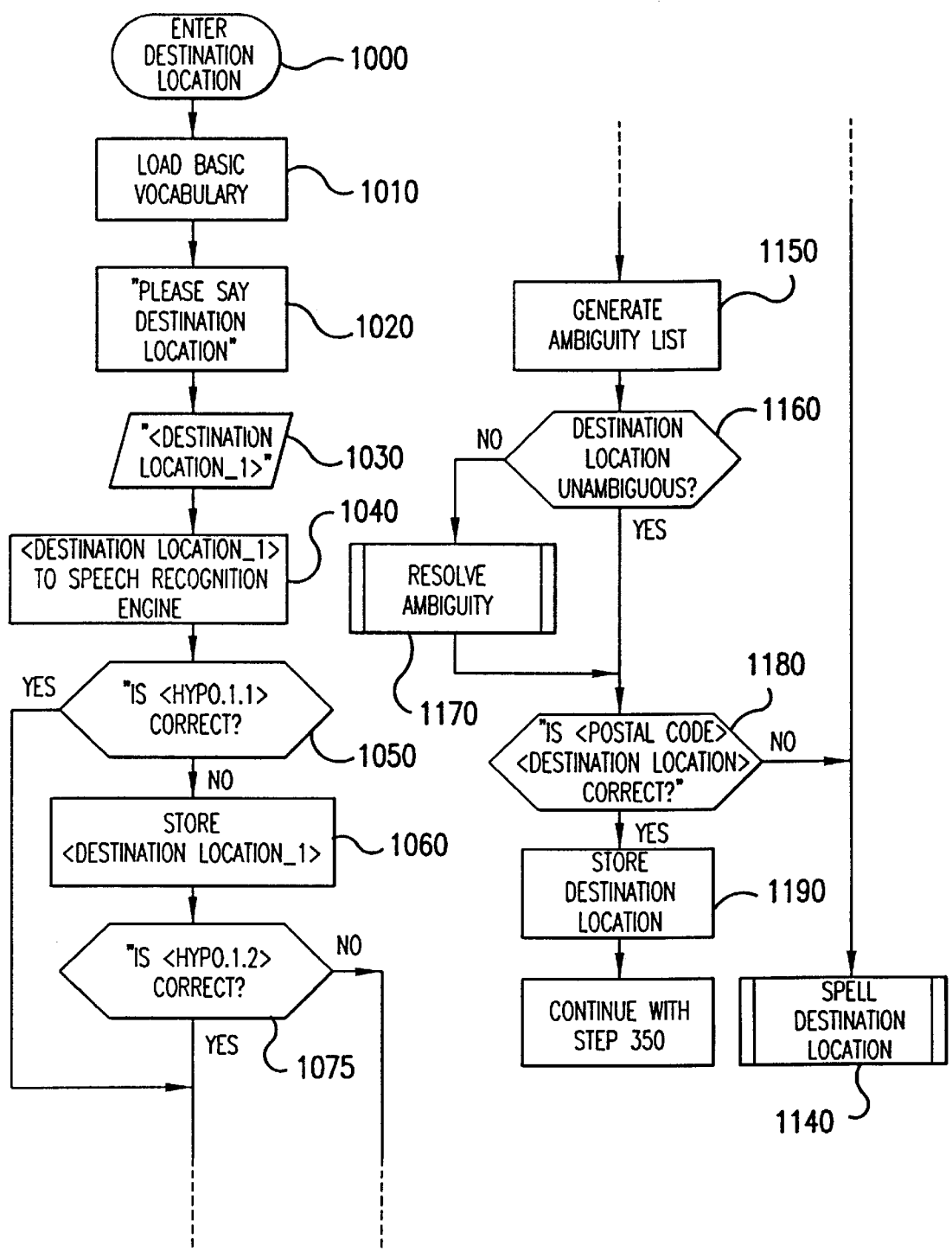
FIG. 3 is a schematic view of a flowchart of a second embodiment for the input dialogue "destination location input"

FIG. 3 is a schematic representation of a second embodiment of the input dialogue in "destination location input." The method steps 1000 to 1060 have already been discussed in the description of FIG. 2. In contrast to the first embodiment of the input dialogue, following step 1060 the input dialogue "destination location input" continues with step 1075 and not with step 1070. In step 1075 the place name is output that has the second-largest recognition probability on the first hypothesis list hypo.1 as a speech output and a <hypo.1.2> is output to the user with the question as to whether or not <hypo.1.2> corresponds to the desired input <destination location_1>. If question 1075 is answered "yes" a jump is made to step 1150. If the user answers the question by "no" a branch is made to step 1140. In step 1140 the input dialogue "spell destination location" is called up. The method steps following step 1150 have already been discussed in the description of FIG. 2 and therefore will not be described here any further.

Figure 4:
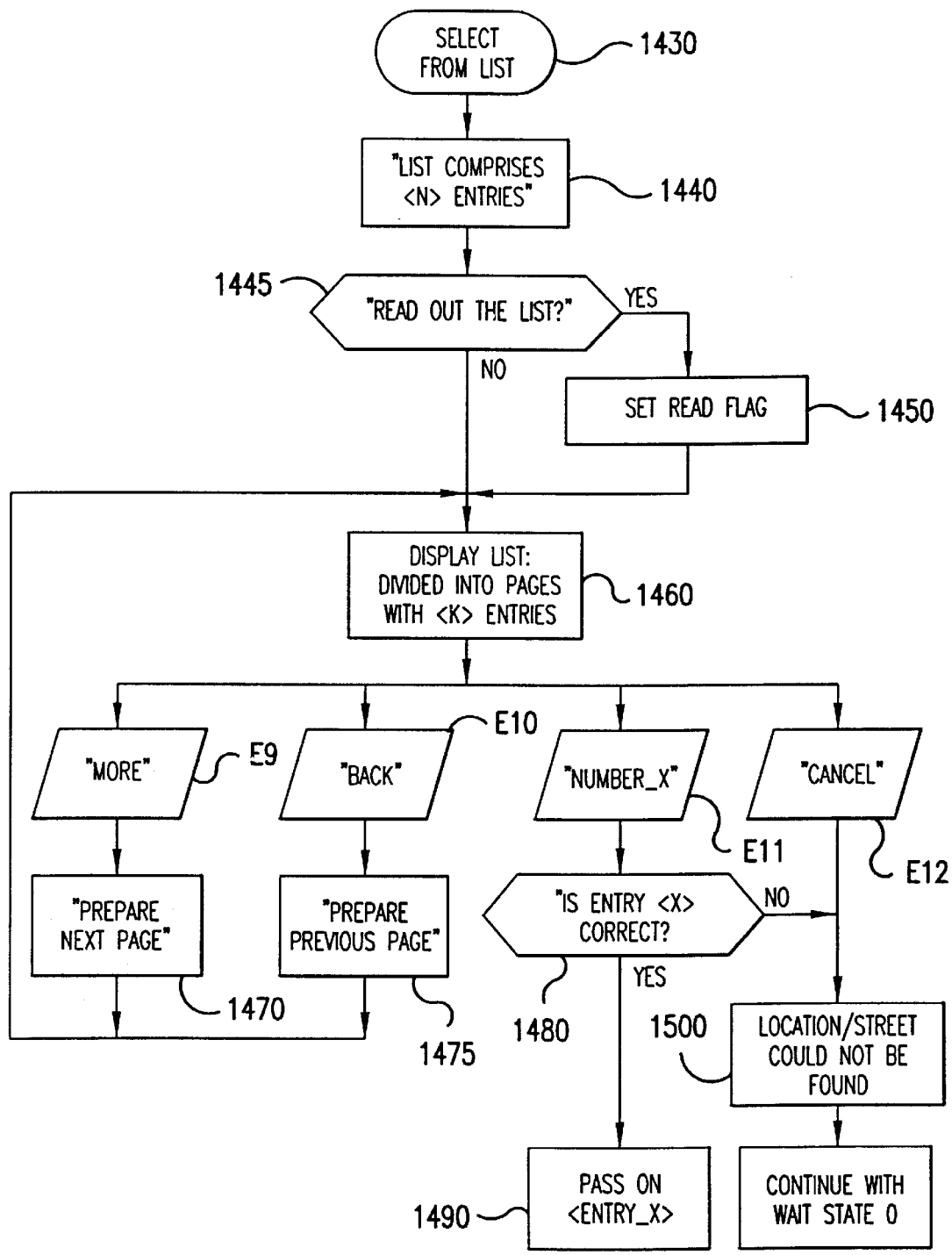
FIG. 4 is a schematic view of a flowchart for the input dialogue "choose from list"

FIG. 4 is a schematic diagram of one embodiment of a flowchart for an eighth input dialogue, hereinafter referred to as "select from list" for selecting an entry from a list. Following activation of the input dialogue "select from list" in step 1430 by another input dialogue, the user is informed in step 1440 about the number of entries in the list and is asked in step 1445 whether or not the list should be read out. If the user answers the question by "yes," in step 1450 a read flag is set and a branch is then made to step 1460. If the user answers the question by "no" the process is continued directly with step 1460. In step 1460 the user is shown the list with the request to select an entry from the list with the list being displayed only on a display in the navigation system when the read flag is not set. If the read flag is set the list is also read out by speech output. The list is then divided into pages which for example include up to four entries with the entries on each page again being numbered continuously starting with one.

In step 1460 the user can speak various speech commands to continue the input dialogue. Using a first speech command E9 "continue" for example the user in step 1470 can turn to the next page in the list and then return to step 1460. With a second speech command E10 "back" for example the user in step 1475 can go back to the previous page in the list and likewise return to page 1460. With a third speech command E11 "number X" for example the user can select a specific entry from the list with X standing for the number of the desired entry. After the third speech command E11 is spoken, a branch is made to step 1480.

With a fourth speech command E12 such as "interrupt", the user, if for example he has not found the desired entry, can terminate the input dialogue "select from list." For this reason, following the input of the fourth speech command, a branch is made to step 1500. In step 1500, depending on whether the entries in the list consist of street names or place names, the user is informed by speech output that the street name or place name could not be found. Then the system returns to the wait state 0.

In step 1480 a check is made again by asking the user whether or not <entry_X> is correct. To make the choice of the desired entry from the list more convenient, provision can also be made for the corresponding list to be generated as a list lexicon and loaded into the speech recognition device. As a result the user can select the entry as described above by speaking the corresponding number as a third speech command E11 or he can read the corresponding entry in the list and enter it as the third speech command E11. The list includes the desired entry for example: 4. Neustadt an der Weinstraβe, so that the user can either speak "number 4" or "Neustadt an der Weinstraβe" as the third speech command E11 and in both cases the system recognizes the desired entry. If the user answers question 1480 by "yes," in step 1490 the input dialogue "select from list" is ended and the selected "entry_X" is transferred as the result to the input dialogue calling for it. If the user answers question 1480 by "no," a branch is made to step 1500.

Figure 5:
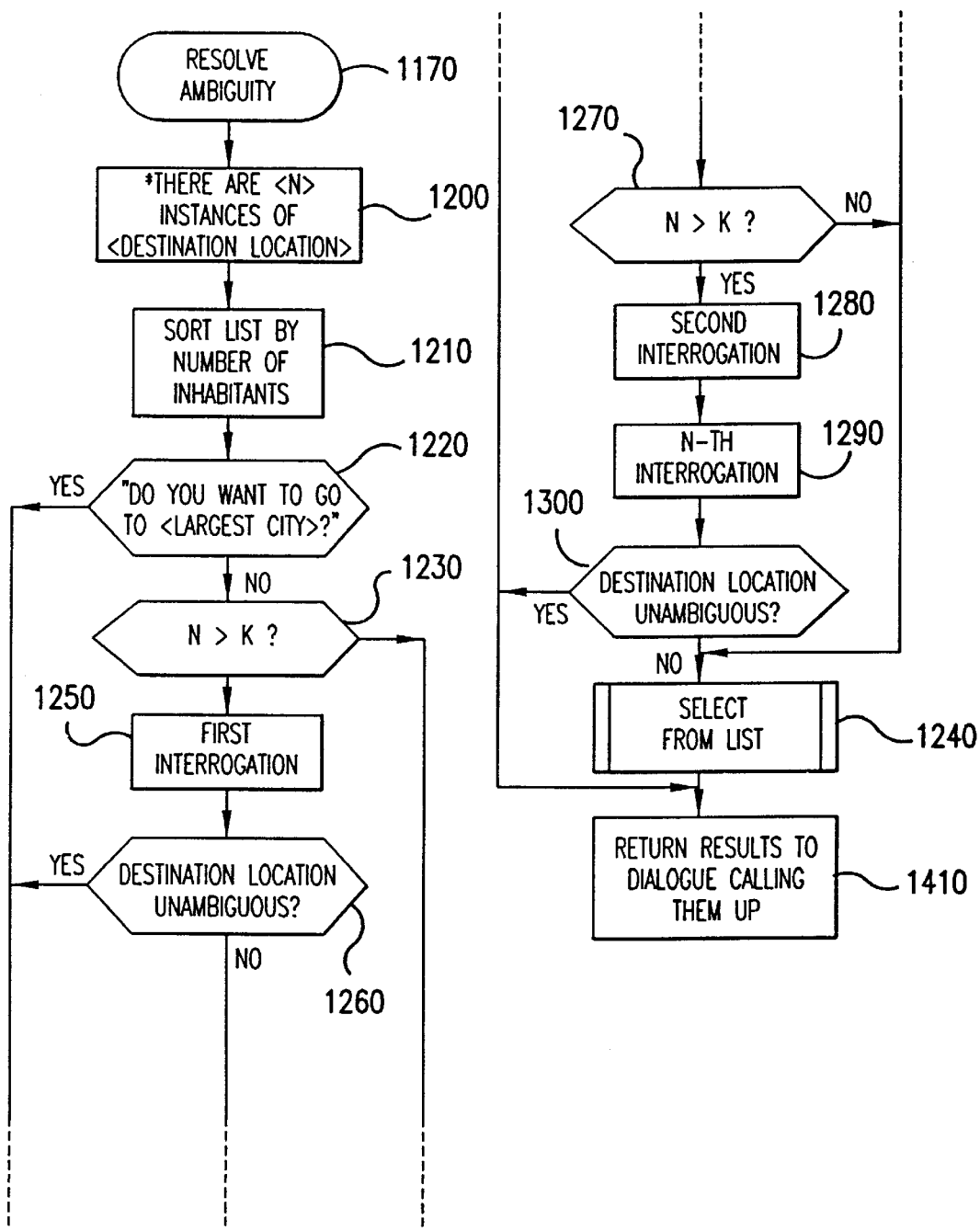
FIG. 5 is a schematic view of a flowchart for the input dialogue "resolve ambiguity"

FIG. 5 shows schematically one embodiment of a flow-chart for a ninth input dialogue, hereinafter referred to as "resolve ambiguity" for resolving ambiguities, for example for the so-called "Neustadt" problem or for homophonic place names. Following activation of the input dialogue "resolve ambiguity" in step 1170 by another input dialogue, the user is informed in step 1200 how many place names are entered in the ambiguity list. Then in step 1210 the place with the largest number of inhabitants is found and output in step 1220 as the acoustic value <largest_place> with the question of whether or not the user is looking for <largest_place> as the destination location. If the user answers question 1220 by "yes" a jump is made to step 1410. In step 1410, "largest_place" is output as the result to the input dialogue calling for it and the input dialogue "resolve ambiguity" is terminated.

If the user answers question 1220 by "no" a check is made in step 1230 of whether or not the ambiguity list contains more than k entries. If the ambiguity list contains k or fewer entries, in step 1240 the input dialogue "select from list" is called up. Parameter k should not be chosen too high since otherwise the input dialogue "select from list" lasts too long. Tests have shown that k=5 is a satisfactory value. If check 1230 shows a positive result, in step 1250 an attempt is made with a first interrogation dialogue to reduce the number of entries in the ambiguity list. Following the first interrogation dialogue, a check is made in step 1260 to determine whether or not the destination location is unambiguous. If check 1260 yields a positive result, a branch is made to step 1410 and if check 1260 yields a negative result, by analogy with step 1230, a check is made in step 1270 as to whether or not the ambiguity list contains more than k entries. If the ambiguity list contains k or fewer entries, a branch is made to step 1240, and if the ambiguity list contains more than k entries, a second interrogation dialogue in step 1280 attempts to reduce the number of entries in the ambiguity list.

The processes described are repeated up to an n-th interrogation dialogue in step 1290. Thereafter, in step 1300 by analogy with step 1260 a check is made to determine whether or not the destination location is unambiguous. If the destination location is unambiguous, a branch is made to step 1410 and if not a branch is made to step 1240. The input dialogue "choose from list" called up in step 1240 delivers as the result an unambiguous destination location back to the input dialogue "resolve ambiguity." In step 1410, as a result of the input dialogue "resolve ambiguity," an unambiguous destination location is passed on to the input dialogue calling for it and the input dialogue "resolve ambiguity" is terminated. As the interrogation dialogue for example the questions can be about the postal code, telephone area code, state, or the next largest city.

The interrogation dialogues begin with a check to determine whether or not the corresponding interrogation makes sense. If for example all of the place names in the ambiguity list are located in one state, asking about the state makes no sense and the state interrogation dialogue is terminated. To determine whether or not a question makes sense, various criteria can be employed. Thus for example an absolute threshold value can be chosen, for example eight entries have the interrogation criterion or 80% of the entries have the interrogation criterion.

Following the check to determine whether or not the activated interrogation dialogue makes sense, the question is output to the user, for example "Do you know what state the destination location is located in?" or "Do you know the postal code (or telephone area code or the next largest city) of the destination location?" Depending on the user's reply, the input dialogue is then continued. If the user does not know the interrogation criterion, a branch is made to the next question. If the user knows the interrogation criterion, he is requested to perform a speech input. During the state interrogation, a state lexicon, if not already present, can be generated and loaded as a vocabulary into the speech recognition device. In addition to the correct designation of the states, conventional abbreviations, for example Würtemberg instead of Baden Württemberg, can be contained in the state lexicon.

If a question does not produce any reduction of the number of entries in the ambiguity list, the original ambiguity list is used for the subsequent input dialogue "resolve ambiguity." If a question results in a reduction of the number of entries in the ambiguity list, the reduced ambiguity list is used for the subsequent input dialogue "resolve ambiguity." It is especially advantageous if the question regarding the postal code is asked as the first interrogation dialogue since this criterion in most applications yields an unambiguous result. This is also true of an interrogation for the telephone area code.

Figure 6:
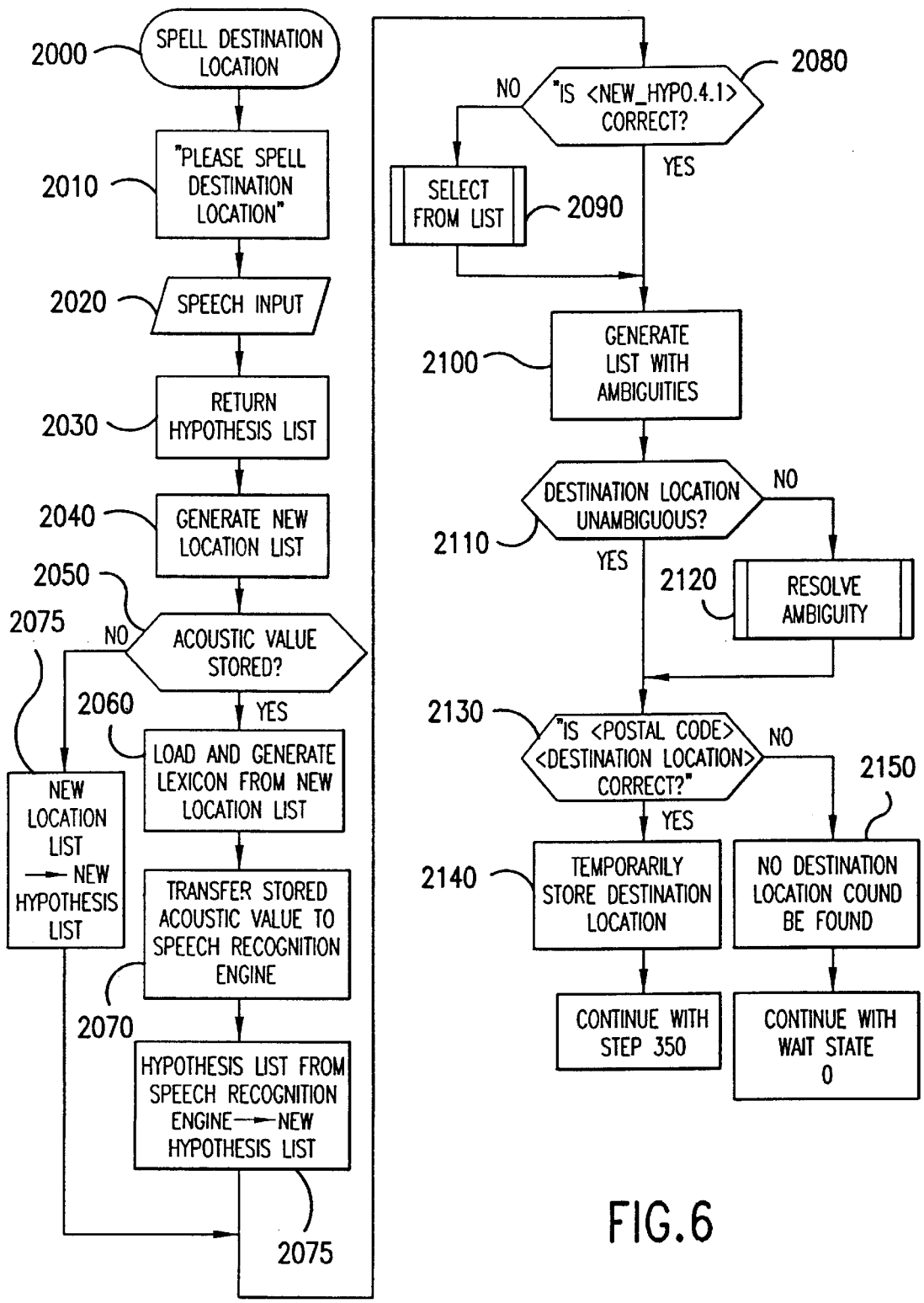
FIG. 6 is a schematic diagram of a flowchart for the input dialogue "spell destination location"

FIG. 6 is a schematic diagram of an embodiment of the input dialogue "spell destination location." Following activation of the input dialogue "spell destination location" in step 2000, the user is requested in step 2010 to spell out the destination location. In step 2020, the speech input is made by the user, with the letters of the destination location being spoken one at a time or in groups of letters separated by brief pauses. In addition, provision can be made for allowing certain word endings such as -heim, -berg, -burg, -hausen, -tal, etc. or prefixes such as Ober-, Unter-, Frei-, Neu-, Bad-, etc. as the word input, with the beginnings of the words and/or the ends of the words being contained together with the admissible letters in a partial-word lexicon with the partial-word lexicon being loaded or activated in the speech recognition engine at the beginning of the input dialogue "spell destination location." The word beginnings, letters, or word endings that are input are fed to the speech-independent speech recognition engine for spelling recognition.

In step 2030 as a result a third hypothesis list hypo.3 is returned by the speech recognition engine with words that were formed from the recognized letters. Then, in step 2040, the hypothesis with the largest recognition probability hypo.3.1 from the third hypothesis list hypo.3 is compared with the destination file. As a result a new place list is obtained that is likewise sorted by recognition probability. Thereafter, a check is made in step 2050 as to whether an acoustic value for the destination location is or is not stored; in other words a check is made to determine whether or not the input dialogue "spell destination location" was called up by another input dialogue, "destination location input" for example. If no acoustic value for the destination location is present, in step 2075 the new place list is adopted as the fourth hypothesis list hypo.4 for continuing the input dialogue and a jump is made to step 2080. If question 2050 yields a positive result, in step 2060 a whole-word lexicon is generated from the new place list and loaded for whole-word recognition into the speech recognition device. There in step 2070 the stored acoustic value of the desired destination location is compared with the whole word lexicon generated from the place list. The speech recognition device delivers as a result in step 2075 a fourth hypothesis hypo.4 sorted by recognition probability. This fourth hypothesis list hypo.4 is adopted for continuing the input dialogue and step 2080 is performed.

In step 2080 the hypothesis with the greatest recognition probability hypo.4.1 is output from the fourth hypothesis list hypo.4 with the question to the user as to whether or not hypothesis hypo.4.1 corresponds to the desired destination location. If the user answers the question by "no," in step 2090 the input dialogue "select from list" is called up. The result of the input dialogue "select from list" in which an unambiguous destination location is involved, is then used in step 2100 to determine from the destination file of all possible locations an ambiguity list in which all the locations are taken from the destination file which correspond in spelling to the hypothesis list hypo.4.1 from the fourth hypothesis list hypo.4 or to the result of the input dialogue "choose from list."

Here it may happen that the entered destination location occurs several times in the list, for example because of the "Neustadt problem" and is therefore not unambiguous. For this reason a check is made in step 2110 to determine whether or not the destination location is unambiguous. If the destination location occurs only once, the input dialogue continues with step 2130. If the destination location is not unambiguous, according to step 2120 the input dialogue "resolve ambiguity" is called up. The result of the input dialogue "resolve ambiguity" is then transferred to step 2130, in which the recognized destination location with certain additional information, for example the postal code and state, is verified, and the user is asked whether the destination location entered is correct. If the answer is "no", the user is informed in step 2150 that the destination location could not be found and the input dialogue is ended. If the answer is "yes", the recognized destination location is stored on an intermediate basis in step 2140 and a branch is made to check 350 according to FIG. 1.

Figure 7:
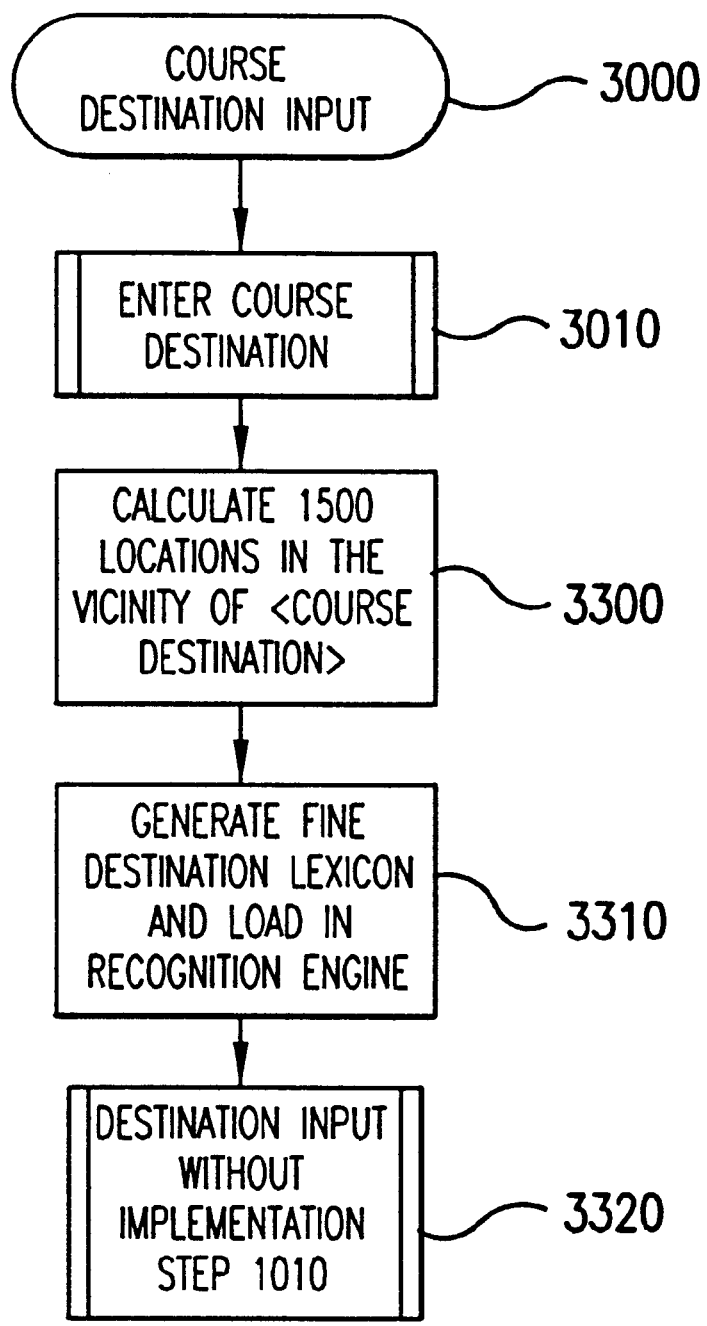
FIG. 7 is a schematic view of a flowchart for the input dialogue "coarse destination input"

FIG. 7 is a schematic diagram of an embodiment of the input dialogue "coarse destination input." In this input dialogue, the user is requested to speak the name of the larger city known to him in the vicinity of the actual destination location as the coarse destination, with the coarse destination presumably being contained in the basic lexicon. Following activation of the input dialogue "coarse destination input" in step 3000, in step 3010 an input dialogue "enter coarse destination" is called up. For the "input coarse destination" input dialogue in step 3010, almost the same procedure takes place as in the "input destination location" input dialogue. In the input request, however, in contrast to step 1020 according to FIG. 2 or FIG. 3, the user is not asked to input the destination location but to input the coarse destination. Following the partial input dialogue "input coarse destination" according to step 3010, the result of the input dialogue "input coarse destination" for continuing the input dialogue "input coarse destination" is transferred to step 3300. In step 3300 m place names in the area of the coarse destination transferred as a result of the input dialogue "input coarse destination" are calculated. The parameter m depends on the performance of the speech recognition device employed and the transmission capacity between the (at least one) database and the speech recognition device.

In the embodiment described, the parameter m is set at 1500. From these 1500 place names, which are part of the destination file, in step 3310 a fine destination lexicon is generated and loaded as vocabulary into the speech recognition device. Then in step 3320 the input dialogue "input destination location" according to FIG. 2 or 3 is performed, except that step 1010 is not performed since the necessary vocabulary for recognizing the destination location is already loaded into the speech recognition device. To shorten the input dialogue "coarse destination input" however it is also possible in the input dialogue "enter coarse destination" to perform an abbreviated version of the input dialogue "input destination location" according to FIG. 3. In the abbreviated version of the input dialogue "input destination location" according to FIG. 3, the input dialogue "spell destination location" is not used and after the interrogation 1075 according to FIG. 3, the input dialogue "spell destination location" is not called up but the user is informed by speech output that the coarse destination could not be found and the input dialogue "input coarse destination" is terminated.

To accelerate the input dialogue, a coarse destination lexicon can be generated for the input dialogue "input coarse destination" and then loaded as the vocabulary into the speech recognition device or activated with the coarse destination lexicon containing only the 400 largest places in the Federal Republic of Germany instead of the 1000 largest places in the basic lexicon. As a result in step 1150 according to FIG. 3 in most applications this will result in a much shorter ambiguity list. In addition, the input dialogue "resolve ambiguity" can be skipped, and instead the input dialogue "select from list" is called up to allow the user to select the desired coarse destination or only the two places with the largest numbers of inhabitants are output in the ambiguity list to the user for the final choice of the coarse destination. If the desired coarse destination was not found, the input dialogue "input coarse destination" is terminated and a return is made to wait state 0.

Figure 8:
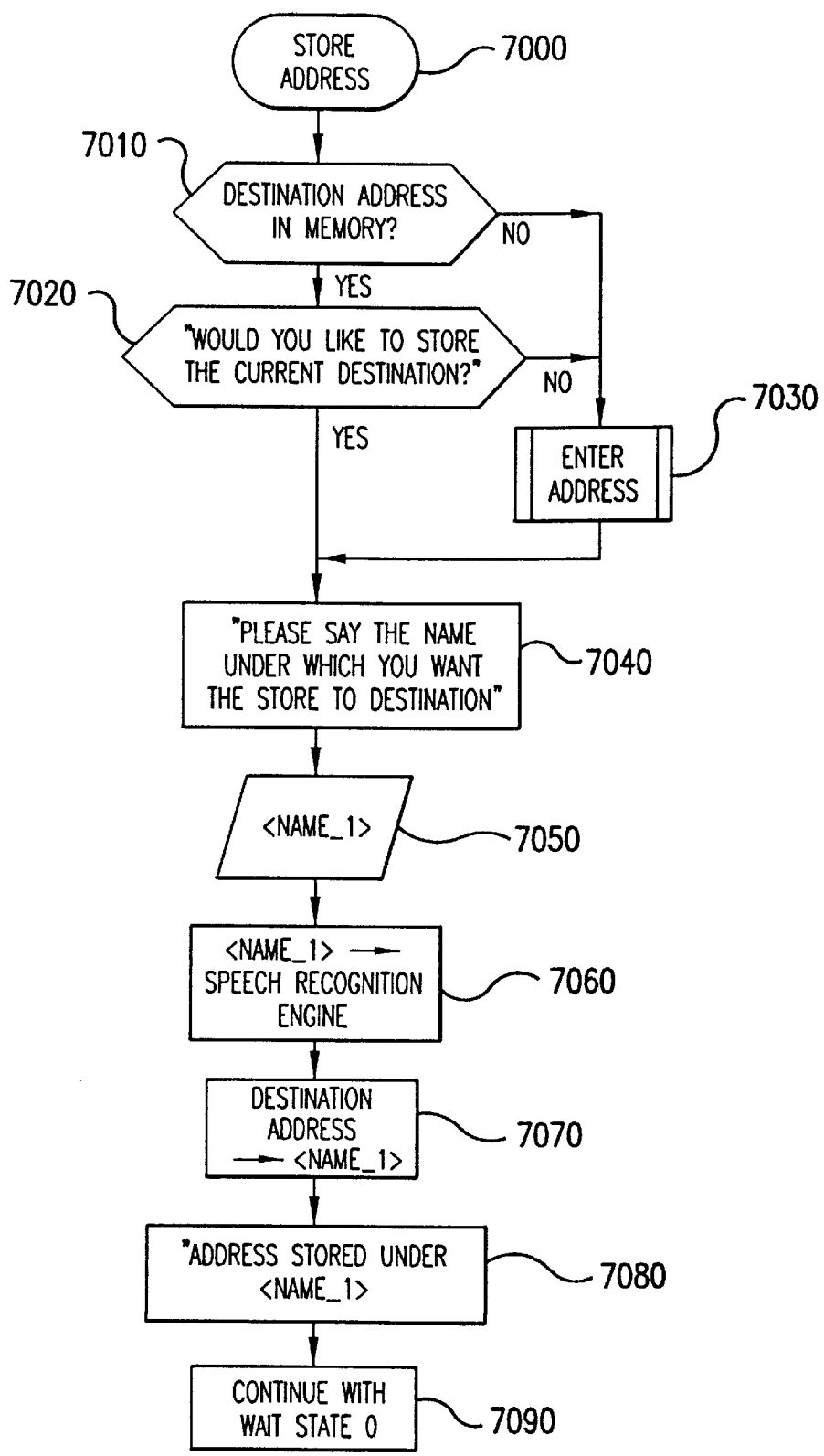
FIG. 8 is a schematic view of a flowchart for the input dialogue "store address"

FIG. 8 is a schematic diagram of one embodiment of the input dialogue "store address." Following activation of the input dialogue "store address" in step 7000, in step 7010 a check is made to determine whether a destination address has already been entered. If so, a branch is made to question to 7020. If, on the other hand, check 7010 yields a negative result, a branch is made to step 7030. In step 7020, the user is asked whether he wants to store the current destination address. If the answer is "yes", a branch is made to step 7040, while if the answer is "no" a branch is made to step 7030. In step 7030 an input dialogue "input address" is called up. The input dialogue "input address" asks the user which of the four input dialogues "input destination location," "input coarse destination," "spell destination location," or "indirect input" the user would like to perform to input the destination address that is to be stored. The choice of the desired input dialogue can be made similarly to the input dialogue "select from list." In addition it is possible that the input dialogue "input address" directly after activation calls up one of the four input dialogues for speech input of a destination location ("input destination location," "spell destination location," "enter coarse destination," or "indirect input"), without outputting a question to the user.

Following speech input of a destination location by analogy with steps 350 and 400 according to FIG. 1, a check is made to determine whether a street name can be entered and if yes, whether or not a street name is to be entered. If no street name is entered, step 450 according to FIG. 1 is performed. Then the input destination address is stored temporarily as the result of the input dialogue "enter address" to continue the input dialogue "store address." In step 7040 the user is requested to speak a keyword which will be assigned to the destination address that has been entered and under which the destination address will be stored in the personal address list. The keyword spoken by the user in step 7050 is supplied in step 7060 as an acoustic value <keyword> to the speech-dependent additional speech recognition engine and possibly verified by repeated speaking, especially twice. Then in step 7070 the input destination address is assigned to the keyword and the acoustic value <keyword> is stored in the personal address list. The user is informed by means of a speech output in step 7080 that the destination address was stored under the <keyword> that was entered. Then in step 7090 input dialogue "store address" is terminated and a branch is made to wait state 0 according to FIG. 1. By means of the input dialogue "call up address" not shown in detail, the stored destination address can be called up by speech input of the associated keyword which is supplied to the speaker-dependent speech recognition device for recognition and transferred to the navigation system. If the keyword was entered in the place list, it is also possible to spell the keyword if the keyword was not recognized as a whole-word input.

Figure 9:
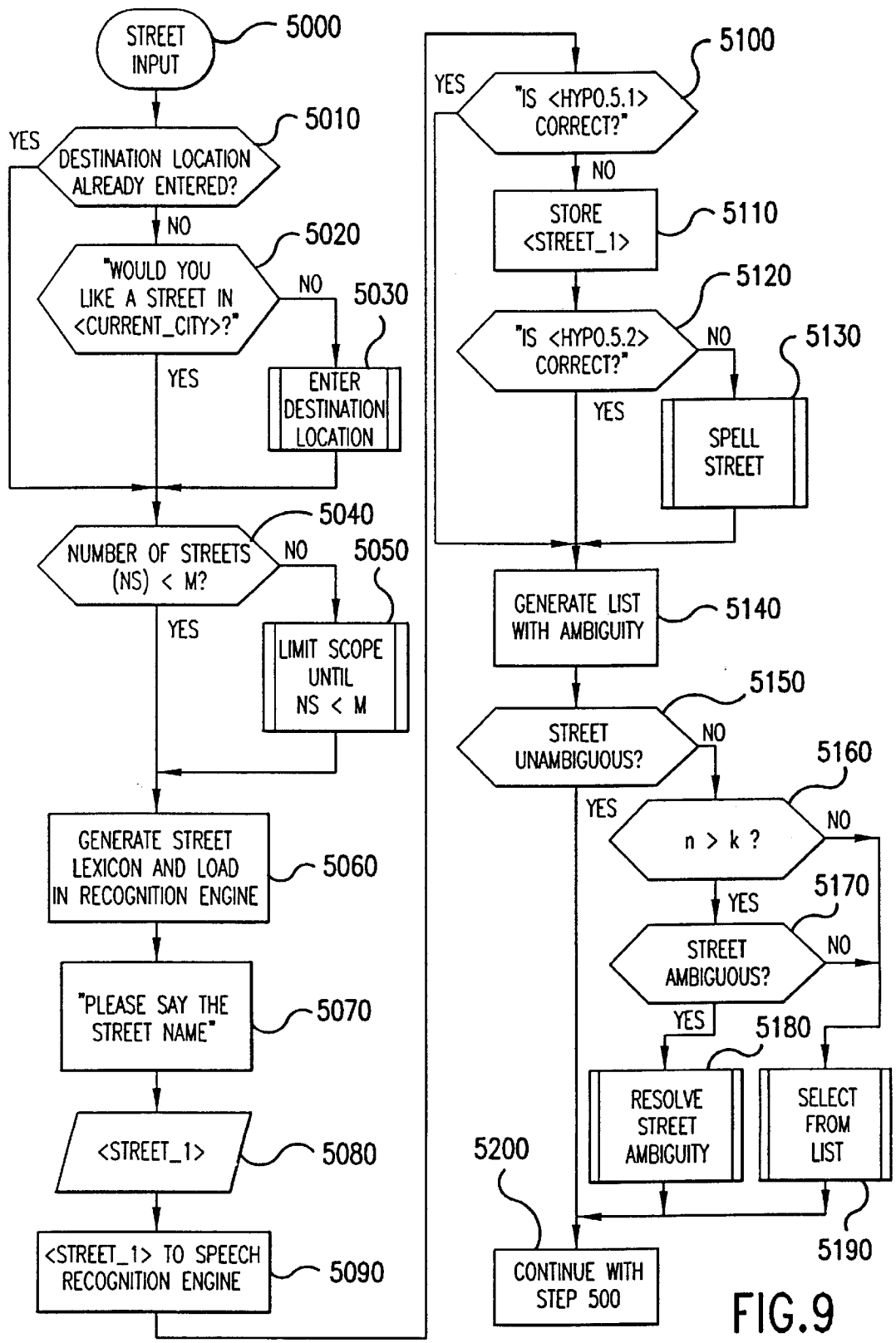
FIG. 9 is a schematic view of a flowchart for the input dialogue "street input"

FIG. 9 is a schematic diagram of an embodiment of the input dialogue "street input." Following activation in step 5000, a check is made in step 5010 as to whether or not a destination location has been entered. If so, the destination location entered is used to continue the input dialogue "street input" and the branch is made to step 5040. If check 5010 yields a negative result, in step 5020 a question is addressed to the user as to whether or not the street is in the current location. The navigation system determines the actual location with the aid of a location procedure known from the prior art, for example by means of the global positioning system (GPS). If the answer is "yes", the current location is used as the destination location for continuing the input dialogue "street input" and the branch is made to step 5040. If the answer is "no", a branch is made to step 5030, in which an input dialogue "enter destination location" is called up. Input dialogue "enter destination location," similarly to the input dialogue "input address" outputs a question to the user as to which of the four input dialogues "input destination location," "coarse destination input," "spell destination location," or "indirect input" the user would like to use for entering the destination address which is to be stored. The choice of the desired input dialogue would then be made similarly to the input dialogue "select from list."

In addition it is possible for the input dialogue "enter destination location" to call up one of the four input dialogues for speech input of a destination location, immediately after activation, without outputting a question to the user. Following the input dialogue, as a result the destination location that was entered, "enter destination location" is used to continue the input dialogue "street input", and a branch is made to step 5040, where a check is made to determine whether the number of streets and the desired destination location is larger than m. Parameter m then depends on the type of speaker recognition device. In the embodiment described, m is set at 1500.

If the number of streets in the desired destination location is less than m, a street list of the desired destination location is transferred to continue the input dialogue "street input" at step 5060. If the number of streets in the desired destination location is larger than m, a branch is made to step 5050, in which an input dialogue "limit scope" is activated for the purpose of reducing the scope of the street list to less than m entries of street names. For this purpose the user can be asked to enter by speech input various selection criteria, for example the name of a part of a city, the postal code, or the initial letters of the desired street name. By analogy with the input dialogue "resolve ambiguity" the selection criteria can be combined as desired. The input dialogue "limit scope" is terminated when the scope has been reduced to m street names or less.

As a result of the input dialogue, the reduced street list is transferred to step 5060. In step 5060 a street lexicon is generated from the transferred street list and loaded into the speech recognition device. In step 5070 the user is requested to speak the street name. Further performance of the input dialogue "street name" is then similar to the input dialogue "destination location entry" according to FIG. 3. The "street_1" spoken by the user (step 5080) is transferred as an acoustic value <street_1> to the speech recognition device, which supplies a fifth hypothesis list hypo.5 to continue the input dialogue "street input" (step 5090).

In step 5100 the street name with the greatest recognition probability <hypo.5.1> is output to the user with the question as to whether or not <hypo.5.1> is the desired street name. If "yes", a branch is made to step 5140. If "no", however, the acoustic value <street_1> is stored in step 5110. Then in step 5120 the street name with the second-greatest recognition probability hypo.5.2 is output to the user with the question as to whether or not <hypo.5.2> is the desired street name. If so, a branch is made to step 5140. If not, however, in step 5130 an input dialogue "spell street" is called up, which is similar to the input dialogue "spell destination location" up to step 2100 and has already been discussed in the description of FIG. 6. Only the terms destination location and new place list must be changed in the description and replaced by the terms street name and new street list. Instead of step 2100 according to the input dialogue "spell destination location" the input dialogue "spell street" is terminated and the result of the input dialogue "spell street" is transferred to step 5140 to continue the input dialogue "street input." In step 5140 the system determines from the street list, which contains all the possible street names in the desired destination location, an ambiguity list in which all the street names on the street list that correspond in spelling to the hypothesis hypo.5.1 or hypothesis hypo.5.2 from the fifth hypothesis list hypo.5 or the result of the input dialogue "spell street" are included.

In step 5150 a check is made to determine whether or not the street name entered is unambiguous. If the street name entered is unambiguous, a branch is made to step 5200. If not, a branch is made to step 5160, in which a check is made to determine whether or not the ambiguity list includes more than k entries. If the ambiguity list contains k or fewer entries, a branch is made to step 5190. If the ambiguity list contains more than k entries, a branch is made to step 5170, and a check is made to determine whether the ambiguity can be resolved by entering additional interrogation criteria, for example the postal code or the part of the city.

If check 5170 yields a positive result, an input dialogue "resolve street ambiguity" is called up in step 5180. This input dialogue runs similarly to the input dialogue "resolve ambiguity" according to FIG. 5. The postal code or part of the city can be entered as interrogation criteria. Then the result of the input dialogue "resolve street ambiguity" is transferred to step 5200 to continue the input dialogue "street input." If check 5170 yields a negative result, a branch is made to step 5190. In step 5190 the input dialogue "select from list" is activated and performed. The result of the input dialogue "select from list" is transferred to step 5200 to continue the input dialogue "street input." In step 5200, the input dialogue "street input" is terminated and the result transferred together with the desired destination location as the destination address to step 500 according to FIG. 1.

FIG. 10 is a schematic block diagram of a device for performing the method according to the invention. As is evident from FIG. 10, the device for working the method according to the invention comprises a speech dialogue system 1, a navigation system 2, and an external database 4 in which the destination file is stored for example. Speech dialogue system 1 comprises a speaker recognition device 7 for recognizing and classifying speech statements entered by a user using a microphone 5, a speech output device 10 that can deliver speech statements to a user by means of a loudspeaker 6, a dialogue and processing control 8 and an internal database 9 in which all the speech commands are stored for example. The navigation system 2 comprises an internal nonvolatile memory 3 in which the basic lexicon is stored for example and an optical display device 11. By means of the dialogue and process control 8, data can be exchanged between the individual components of the device over corresponding connections 12 that can also be made in the form of a data bus.

To illustrate the input dialogues described above, Tables 2 to 6 present various input dialogues.

Table 2: Dialogue Example "Destination Location Input With Resolution of Ambiguities":

| System | User | Note |
|---|---|---|
| | actuates PTT button | User activates the speech dialogue system |
| Beep | | |
| | "destination | The input dialogue |

-continued

| System | User | Note |
|---|---|---|
| | location input" | "destination location input" is activated. |
| "Please say place names" | "Neunkirchen" | |
| | | The speech recognition device compares the acoustic input with the vocabulary activated in the speaker-independent speech recognition engine and outputs the result with the greatest recognition probability. |
| "Is Neunkirchen correct?" | | |
| | "Yes" | The speech dialogue system searches in the destination file for all the entries with the place name "Neunkirchen" and generates internally an ambiguity list according to Table 2a for further processing. |
| "Neunkirchen was found 18 times in 6 states. Do you want the Neunkirchen Metropolitan Area in Saarland? | | The system indicates the ambiguity to the user and proposes as the destination location the location with the most inhabitants since the probability that this one was meant is the greatest. If the user replies "yes," Neunkirchen im Saarland is established as the destination location. If the user answers "no," in order to resolve the ambiguity, additional interrogation criteria must be employed. Possible interrogation criteria include: postal code, telephone area code or the state in which the location to be found is located. Since the |
| | "No" | |
| "Do you know the postal code of Neunkirchen?" | "No" | |
| "Do you know the telephone area code of Neunkirchen?" | "No" | |
| "Do you know the state in which Neunkirchen is located?" | "yes" | |
| "In which state is Neunkirchen located? | "Bavaria" | |
| "There are six places called Neunkirchen in Bavaria. Do you want the locations to be | | If there are only a few locations available, the system asks whether the location should be read out. At the same |

-continued

| System | User | Note |
|---|---|---|
| read out to you?" | | time the system displays the remaining possible locations on the display device of the navigation system. (Also possible: If only two locations are available, the system reads out both locations and then asks the user to choose one of the two locations as the destination location). |
| | "Yes." | |
| "Please choose from the following locations: Neunkirchen 1. am Brand in Forchheim County 2. am Sand in Nürnberg-Land County 3. in Miltenberg County 4. near Leutershausen in Ansbach County, more" | | |
| | "More" | The next page is displayed. For an improved overview and to keep the vocabulary small, the locations displayed are numbered on each page beginning with one. |
| "Neunkirchen 1. at Teisendorf in Berchtesgadener Land County 2. at Weidenberg in Bayreuth County | | |
| | "Number two" or "Neunkirchen bei Weidenberg" | |
| "Navigation programmed for Neunkirchen bei Weidenberg in Bayreuth County in Bavaria." | | This establishes the destination location, and the street names associated with the destination location can be loaded if necessary. |
| . . . | . . . | . . . |

TABLE 2a

Ambiguity List

| Serial No. | Postal Code | Telephone Area Code | State | Additional Naming Component | County | Inhabitants |
|---|---|---|---|---|---|---|
| 1: | 66510–66589 | 06821 | SL | | Neunkirchen | 51863 |
| 2: | 53819 | 02247 | NW | Seelscheid | Rhein-Sieg County | 17360 |
| 3: | 57290 | 02735 | NW | | Siegen-Wittgenstein | 14804 |
| ... | ... | ... | ... | ... | ... | ... |
| 17: | 83317 | 08666 | BY | am Teisenberg | Berchtesgadener Land | 0 |
| 18: | 95466 | 09278 | BY | | Bayreuth | 0 |

TABLE 3

Dialogue Example: "Combination of 'Destination Location Input' and 'Spell Destination Location' Without Ambiguity"

| System | User | Note |
|---|---|---|
| | Operates PTT button | User activates speech dialogue system. |
| Beep | | |
| | "Destination input" | |
| "Please say place name" | | |
| | "Elmenthal" | The user speaks the name of the location, erroneously assuming that it is contained in the basic vocabulary. Since Elmenthal is not in the basic vocabulary, an error message appears (result from speaker-independent speech recognition device: 1. Hypothesis: Emmerthal 2. Hypothesis: none) Verification of recognition process. |
| "Is Emmerthal correct?" | | |
| | "No" | |
| "Please say place name again." | | |
| | "Elmenthal" | Incorrect recognition occurs once again. (Result from speaker-independent speech recognition device: 1. Hypothesis: Emmerthal 2. Hypothesis: Elmshorn) In this case the second hypothesis is checked because the first hypothesis was already rejected by the user during the previous verification. Verification of second hypothesis. |
| "Is Elmshorn correct?" | | |
| | "No" | |
| | | The speech input is now stored temporarily for a later attempt at recognition. The input dialogue "spell destination location" is called up. |
| "Please spell the name of the location." | "E-L-M-E-N" pause "T-H-A-L" | The user speaks the letters together. He has the possibility of speaking the letters in groups separated by short pauses. After a longer pause, the recognition device cuts off the input and outputs a list of hypotheses. (Result of the letter recognition: 1. Hypothesis: Ülmenthal 2. Hypothesis: Ülmenphal ...) The speech dialogue system calculates from the first hypothesis a list of locations that could be possible destination locations: Elmenthal 8.06365 Blumenthal 12.4422 ... From these locations a new whole-word lexicon is generated (on the order of about 100 words) and loaded into the recognition device. The previously stored speech input "Elmenthal" serves as the new speech input. Since the desired location is now contained in the vocabulary, it is possible to recognize the location correctly. |
| "Is Elmenthal correct" | | |
| | "Yes" | Since Elmenthal is clearly included in the ambiguity list generated, no further verification is needed. |
| "Navigation programmed for Elmenthal in Schmalkalden-Meiningen County in Thuringia" | | This establishes the destination location, and the street names for the destination location can be loaded if necessary. |
| ... | ... | ... |

TABLE 4

Dialogue Example "Coarse Destination Input" without Ambiguity

| System | User | Note |
|---|---|---|
| | Operates PTT button | The user activates the speech dialogue system |
| Beep | | |
| | "Coarse destination" | |
| "Please speak coarse destination" | | |
| | "Stuttgart" | |
| "Is Stuttgart correct?" | | Verification of results of recognition. |
| | "Yes" | |
| "Loading lexicon for Stuttgart" | | The lexicon with 1500 place names in the Stuttgart area is generated and loaded into the speech recognition device. The lexicon can also be calculated in advance if desired and loaded into the database. After loading, the desired destination location can be |

TABLE 4-continued

Dialogue Example "Coarse Destination Input" without Ambiguity

| System | User | Note |
|---|---|---|
| "Say place name" | | entered. |
| | "Wolfschlugen" | |
| "Is Wolfschlugen correct?" | | Verification of results of recognition. |
| | "Yes" | |
| "Navigation programmed for Wolfschlugen in Esslingen County in Baden-Württemberg" | | Because Wolfschlugen is unambiguous, no further questions need be posed and the navigation system can load the street names of Wolfschlugen if available, if necessary. |
| ... | ... | ... |

TABLE 5

Dialogue Example 5 "Street input"

| System | User | Note |
|---|---|---|
| | Operates PTT button | User activates speech dialogue system |
| Beep | | |
| | "street input" | |
| "Would you like to enter a street name for Stuttgart?" | | The system asks whether the current city has been correctly entered as the destination location. If the answer is "no" a dialogue for entering a destination location must be called up first (input dialogues 1–4) |
| | "Yes" | The user would like to enter a street name for Stuttgart. The number of street names for this city is about 3200 and therefore exceeds the maximum vocabulary size of the speech recognition device which is approximately 1500 words. The user is therefore requested to speak the initial letters of the street name in order to generate a street lexicon from all the street names with these initial letters and to load them into the speech recognition device. It would also be possible in this case to enter a range of letters such as A to E, F to J, etc. Then however several files would have to be loaded and calculated. In addition, with a larger vocabulary, the probability of ambiguity increases. |
| "Please say the initial letters of the street name" | | |
| | "P" or "P as in Paula" | |
| "Please choose from the alternatives" | | Since the ambiguity probability for the letters is very high, the recognition device presents a choice of hypotheses on the display device of the navigation system and/or in the form of a speech output. Using the number displayed, the user can select the desired letters or request a new input if the spoken letter is not there. If the recognition device returns only one alternative, the system offers it as the recognized initial letters to the user for verification. In the case of the second type of input "P as in Paula" the danger of improper recognition is reduced considerably but the user must know the identifiers for the individual letters. With more than one letter hypothesis, the following appears on the display and/or as a speech output:<br>1. W as in Wilhelm<br>2. G as in Gustav<br>3. B as in Berta<br>4. E as in Emil<br>5. D as in Dora<br>6. P as in Paula |
| | "Number six" | |
| "Loading street names beginning with 'P as in Paula'" | | The speech dialogue system in this case generates a street list with 87 street names with the initial letter P. Since the number of files to be loaded with the initial letters is small, this input reduces the waiting time for the user to a minimum. Then a street lexicon for the speaker-independent speech recognition device is generated from the street list and the user is requested to speak the street name. |
| "Please say the street name" | | |
| | "Pflasteräckerstraße" | |
| "Is Pflasteräckerstraße correct? | | Verification of street name. |
| | "Yes" | |
| "Navigation system programmed for 'Stuttgart, Pflasteräckerstraße'" | | |
| ... | ... | ... |

TABLE 6

Alternative Input Dialogue "Street input"

| System | User | Note |
|---|---|---|
| | Operates PTT button | User activates speech dialogue system |
| Beep | | |
| | "street input" | |
| "Do you want to enter a street name for Reutlingen?" | | The system asks whether the current city is a correct destination location. If the answer is "no" a dialogue for entering a destination location must be called up first (input dialogues 1–4) |
| | "Yes" | The user would like to enter a street name for Reutlingen. The number of street names in this city is below 1500 and therefore does not exceed the maximum vocabulary size of the speech recognition engine which is about 1500 words. |
| "Please say the street name" | | |
| | "Bismarkstraße" | The acoustic value <Bismarkstraße> of the speech input is stored and an ASCII list with the street names of the destination |

TABLE 6-continued

Alternative Input Dialogue "Street input"

| System | User | Note |
|---|---|---|
| | | location is loaded from the database. |
| "Please spell the street name" | | |
| | "B-I-S-M-A-R-K" pause "STRAβE" or alternatively "B-I-S-M-A-R-K" | The user speaks the letters together or in groups of letters separated by a brief pause. Alternatively the suffix "-straβe," "-gasse," or "-weg" can be omitted. After a prolonged pause the speech recognition device interrupts entry and calculates as the result a hypothesis list. From the first hypothesis or from the first n hypotheses in this hypothesis list a street list with the street names that match the street entered can be generated by comparison with the ASCII list in the database. From this street list, a street lexicon is generated and loaded into the speech recognition device. Then the stored acoustic value <Bismarkstraβe> is compared in the speech recognition device with the vocabulary of the street lexicon and the street name with the greatest recognition probability is output. |
| "Is Bismarkstraβe correct?" | | |
| | "Yes" | Since Bismarkstraβe is unambiguous as recognized, no further interrogations are required. |
| "Navigation system programmed for Reutlingen, Bismarkstraβe" | | |
| . . . | . . . | . . . |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for speech input of a destination address into a navigation system in real time, in which the entered speech of a user is recognized by a speech recognition device, with at least one speech statement being an admissible speech statement that activates at least an associated operating function of the navigation system, all of the admissible speech statements being stored in at least one database, comprising:

activating at least one operating function of the navigation system and an input dialogue mode for communicating with the navigation system, by means of an admissible speech statement;

generating at least one lexicon in real time following activation of the at least one operating function, a word content of the at least one lexicon being selected to include only words which can be used to communicate via said activated input dialogue mode and said speech recognition device;

loading the at least one lexicon as a vocabulary into the speech recognition device; and using words in said lexicon to input information into said navigation system via said speech recognition device.

2. Method according to claim 1 wherein:

the at least one lexicon is generated from admissible speech statements stored in at least one database in an off-line editing mode; and the at least one lexicon generated in the off-line editing mode is loaded in real time as the vocabulary into the speech recognition device after activation of the at least one operating function of the navigation system depending on the at least one input dialogue.

3. Method according to claim 1 wherein:

at least one speech statement is at least one of a place name and a street name, with all admissible place names being stored in a destination file, and all admissible street names for at least one admissible place name being stored in a street list.

4. Method according to claim 1 wherein the speech recognition device comprises at least one speaker-independent speech recognition engine and at least one speaker-dependent additional speech recognition engine, whereby, based on an input dialogue, the speaker-independent speech recognition engine for recognizing place names, street names, or letters spoken one at a time or in groups or parts of words is used, and the speaker-dependent additional speech recognition engine is used to recognize at least one spoken keyword.

5. Method according to claim 4 wherein a particular destination address is assigned to the at least one keyword, with the at least one spoken keyword being stored in a personal address list, a name lexicon being generated from the personal address list and loaded into the speech recognition device.

6. Method according to claim 2 wherein a basic lexicon generated in the off-line editing mode contains a predetermined number of the largest places in a geographic area.

7. Method according to claim 6 wherein the basic lexicon is stored in an internal nonvolatile memory of the navigation system.

8. Method according to claim 1 wherein an environment lexicon generated in real time contains a predetermined number of locations in an area of current vehicle location, with the environment lexicon being updated at regular intervals.

9. Method according to claim 8 wherein the environment lexicon is stored in an internal, nonvolatile memory of the navigation system.

10. Method according to claim 3 wherein:

following activation of an input dialogue "spell destination location," a partial-word lexicon for letter recognition is loaded into the speech recognition device;

the user then enters individual letters and/or letter groups as speech statements, which are compared in the speech recognition device with the partial-word lexicon, a hypothesis list with word hypotheses being formed from the recognized letters and/or letter groups;

a predetermined number of the word hypotheses are then compared with a destination file and a whole-word lexicon is generated from the result of the comparison, and is loaded into the speech recognition device for whole-word recognition; and a stored acoustic value in the speech recognition device is then compared with the whole-word lexicon for whole-word recognition, with this acoustic value being generated from a speech statement spoken as a whole word prior to the loading of the partial-word lexicon.

11. Method according to claim 1 wherein:

following recognition of a "coarse destination" entered by means of an input dialogue "enter coarse destination," the navigation system calculates in real time a preset number of locations in the area around the location "coarse destination"; and from the preset number of locations a fine destination lexicon is generated and loaded into the speech recognition device.

12. Apparatus for speech input of destination information into a navigation system, said apparatus comprising:

a speech recognition device, for recognizing a spoken speech statement as an admissible speech command;

a dialogue and process control which activates an operating function of the navigation system that is associated with a particular speech command, in response to recognition by said speech recognition device of a speech statement spoken by a user, as the particular speech command; and at least one database storing all admissible speech statements; wherein each operating function has at least one dialogue mode associated therewith; and in response to recognition by said speech recognition device of an input dialogue mode associated with the activated operating function, the dialogue and process control can generate at least one lexicon in real time, a word content of said lexicon be selected from admissible speech statements stored in the at least one database, and being limited to words which can be to communicate via the recognized dialogue mode which lexicon can be loaded as vocabulary into the speech recognition device.

13. Device according to claim 12 wherein:

the dialogue and process control generates the at least one lexicon in an off-line editing mode; and the at least one lexicon is stored in at least one database, and is loaded in real time as vocabulary into the speech recognition device.

14. Method for voice actuated entry of input information into a computer which is programmed to perform operating functions, comprising:

storing all admissible speech statements in a memory;

processing entered speech of a user by means of a speech recognition device which classifies said speech as at least one admissible speech statement according to its recognition probability;

identifying a speech statement with the greatest recognition probability as speech which was entered, at least one speech statement being an admissible speech statement for activating an associated operating function in said computer;

activating at least one operating function in said computer in response to identification of an input speech statement, generating at least one lexicon in real time following activation of said at least one operating function in said computer, in response to an input speech statement identified from among said admissible speech statements, said lexicon comprising a subset of admissible speech statements which are selected from admissible speech statements stored in said memory, and which can be used to communicate information for said activated operating function;

entering said lexicon into said speech recognition device; and using said lexicon as a vocabulary in said speech recognition device, for controlling implementation of said operating function.

15. A method of operating a vehicle navigation system having a speech recognition unit and a stored permissible vocabulary for communication via said speech recognition unit, said method comprising:

providing a plurality of dialogue modes for interactive voice communication of information between an operator and the vehicle navigation system via the speech recognition unit;

providing in each particular dialogue mode measures for establishing at least one associated lexicon comprising a limited subset of vocabulary words from said permissible vocabulary, said subset including only words which are usable for communicating information according to the particular dialogue mode;

selecting a dialogue mode in response to entry of a voice command into said vehicle navigation system via said speech recognition unit;

generating an associated lexicon for the selected dialogue mode;

loading said associated lexicon into said speech recognition system; and entering information into said navigation system via said speech recognition system according to said lexicon and said selected dialogue mode.

16. The method according to claim 15 wherein, in an initialization step, a basic vocabulary and a vocabulary of speech recognition commands are first loaded into said speech recognition unit.

17. The method according to claim 16, wherein said basic vocabulary contains words descriptive of a set of largest cities in a geographic area of interest.

* * * * *